April 30, 1940.  H. W. HOW  2,198,820
TIRE MOUNTING FOR ROTARY DRIERS, KILNS, AND SIMILAR EQUIPMENT
Filed March 30, 1939
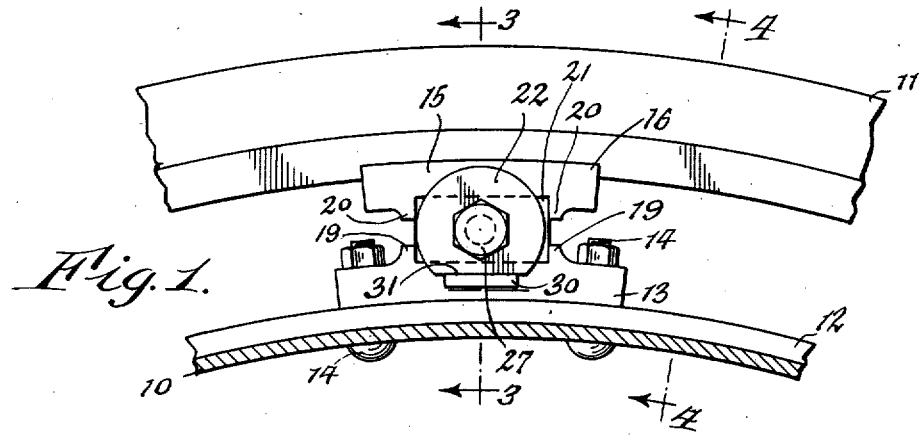
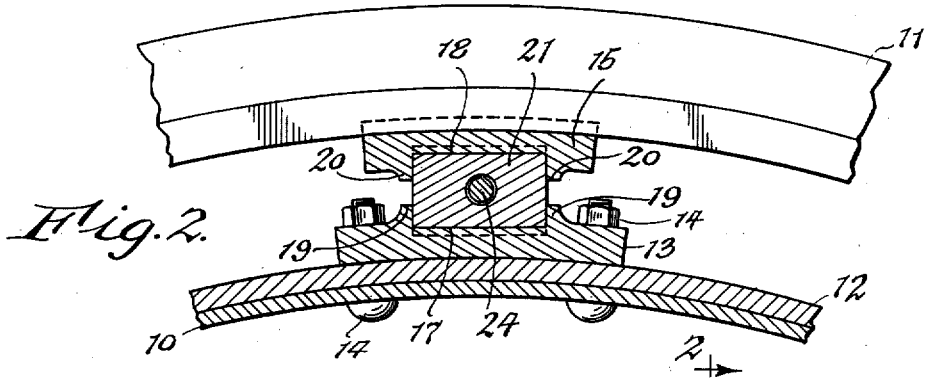
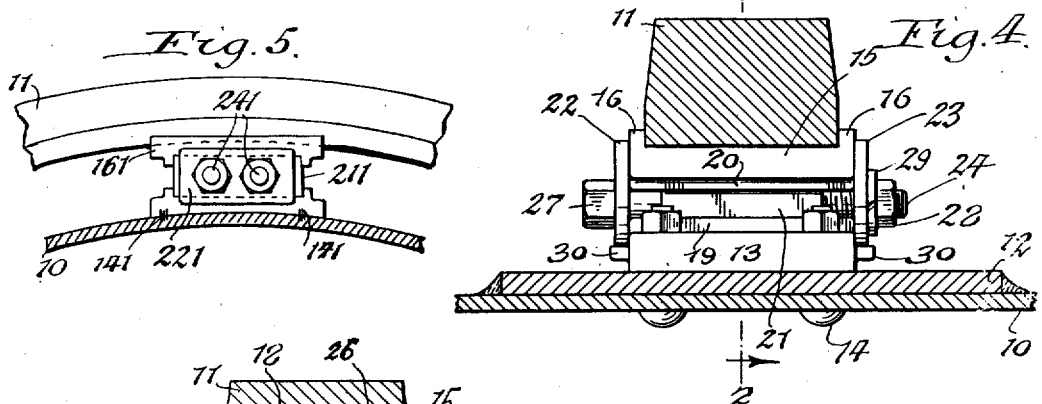
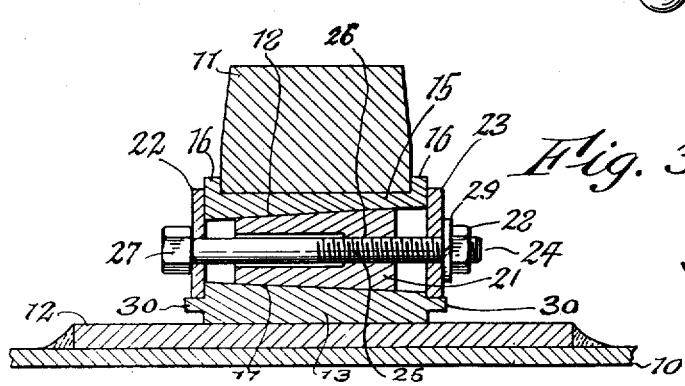
INVENTOR
Harlan W. How
BY Popp & Popp
ATTORNEYS Patented Apr. 30, 1940

2,198,820

UNITED STATES PATENT OFFICE

2,198,820

TIRE MOUNTING FOR ROTARY DRIERS, KILNS, AND SIMILAR EQUIPMENT

Harlan W. How, Titusville, Pa., assignor to Struthers Wells-Titusville Corporation, Titusville, Pa., a corporation of Maryland Application March 30, 1939, Serial No. 265,000

5 Claims. (Cl. 308—204)

This invention relates to means for mounting a tire on the exterior of the rotary shell or drum of driers, kilns and similar equipment and more particularly to means for this purpose which employ a wedge so as to permit of adjusting the tire on the shell and centering the same relative to the axle thereof and also permit of readily removing the tire and replacing the same when this, for any reason, becomes necessary.

The objects of this invention are to provide a tire mounting of this character which is very simple and durable in construction, which can be conveniently operated for adjusting the tire relative to the shell and also removed therefrom and which holds the tire reliably in its operative position on the shell after the adjustment has been effected.

In the accompanying drawing:

Fig. 1 is a fragmentary cross section of the shell or drum of a rotary drier, kiln or the like upon which a tire is mounted by a means which embody this invention.

Fig. 2 is a section taken on line 2—2, Fig. 4.

Figs. 3 and 4 are sections taken on the correspondingly numbered lines in Fig. 1.

Fig. 5 is a fragmentary cross section, similar to Fig. 1, showing a modification of this invention.

In the following description similar characters of reference indicate like parts in the several figures of the drawing.

The numeral 10 represents the tubular shell, drum or body of a rotary drier, kiln or similar equipment into which the material to be treated may be fed and the finished material removed therefrom in any approved manner now commonly used for this purpose.

At different points in the length of the shell the same is surrounded by an annular tire or bearing ring 11, each of these tires being mounted on the shell so as to rotate therewith and also running at its periphery in engagement with a plurality of supporting rollers so as to permit of rotating the shell or drum in a manner well known in this art.

Each of the tires is mounted on the periphery of the shell by means of a plurality of mounting units which are arranged at different points circumferentially of the shell and tire. For the purpose of reinforcing the shell and providing a suitable base for the several mounting units, the shell is provided on its periphery underneath each of the supporting tires with an annular wrapper plate or band 12 which is connected with the shell by electric welding or otherwise so as to practically form an integral part thereof and in the further description of this invention this wrapper plate will be so regarded.

Each of the mounting units whereby the tire is adjustably and removably mounted on the shell is constructed as follows:

The numeral 13 represents an inner shoe which is preferably secured to the outer surface of the wrapper plate or band 12 by means of bolts 14 passing through opposite ends of this shoe and the adjacent parts of the wrapper plate 12 and the shell 10, although any other suitable connecting means may be employed if desired.

Opposite the outer side of the inner shoe is arranged an outer shoe 15 which engages with its outer side against the bore or inner side of the respective tire but is not connected therewith. Movement of the outer shoe and the tire relatively to each other in a direction lengthwise of the axis of the shell and tire is prevented by means of retaining flanges 16 projecting outwardly from opposite sides of the outer shoe and engaging with opposite lateral sides of the tire 11, as best shown in Figs. 3 and 4.

On their opposing sides the inner and outer shoes are provided with guideways or recesses, the respective bottoms 17 and 18 of which are inclined and converge in a direction lengthwise of the axes of the shell and tire. On opposite longitudinal sides of the bottom 17 of the guideway or recess of the inner shoe, the latter is provided with outwardly projecting retaining flanges or walls 19, and on opposite sides of the bottom 18 of the outer shoe the same is provided with similar inwardly projecting retaining flanges or walls 20.

The numeral 21 represents a wedge arranged in the guideways or recesses of the inner and outer shoes and engaging its inner and outer inclined sides with the inclined bottoms 17 and 18 of the guideways in the inner and outer shoes, while the opposite lateral sides of this wedge engage with the retaining flanges 19 and 20 of these shoes, thereby preventing these shoes and the wedge from moving relatively to one another in a direction circumferentially of the shell and tire but permitting the wedge to move in a direction lengthwise of the axis of the shell and tire.

Various means may be employed for moving the wedge lengthwise on the inner and outer shoes for the purpose of adjusting the tire relative to the shell and securing the same thereto and also releasing the wedge preparatory to removing the same from the shell. The preferred means for this purpose shown in the drawing are constructed as follows:

The numerals 22 and 23 represent two thrust plates or washers each of which engages one pair of corresponding sides of the inner and outer shoes so as to bridge the gap between these shoes. In the drawing the thrust plate 22 engages the sides of the shoes adjacent to the narrowest part of the tapering space between the inclined bottoms of the guideways on the shoes while the other thrust plate 23 engages the opposite sides of the shoes adjacent to the widest part of this tapering space.

The numeral 24 represents the body or shank of an adjusting bolt or screw, the threaded part 25 of which engages with an internally threaded opening 26 formed in the wedge in a direction lengthwise of its inclined surfaces. The shank of the adjusting bolt passes loosely through openings in the thrust plates and the integral head 27 at one end of this bolt bears against the outer side of the thrust plate 22 while the screw nut 28 on the opposite threaded end of this shank engages with the outer side of the other thrust plate 23 through the medium of an interposed lock washer 29.

In assembling these parts, when mounting a tire on the shell, the tire is first placed around the several inner shoes on the shell, then an outer shoe is applied to the inner side of the tire opposite each of the inner shoes, and then a wedge is inserted into the opposing guideways or recesses of the shoes so that the tire is temporarily retained in an approximately correct position upon the shell. The thrust plates are now placed against opposite sides of the shoes and the adjusting bolt is assembled with the wedge and thrust plates after which the adjusting bolt of each mounting unit is tightened in order to exert a wedge action of each wedge on the cooperating inclined surfaces of the shoes for rigidly securing the tire on the shell and also centering the tire with reference to the axis of the shell. After such adjustment and tightening of the bolt has been effected the nut 28 is also tightened so as to clamp the thrust plate 23 against the respective sides of the shoes and hold the several parts against loosening while the apparatus when in use is subjected to vibrations or strains.

In order to prevent the thrust plates from rotating with the shank, head and nut of the adjusting bolt, stop means are provided which preferably consist of stop lugs 30 arranged on opposite sides of the central part of the inner shoe and engaging the outer flat side of each of these stop lugs with a flat stop surface 31 on the adjacent edge portion of the respective thrust plate, as best shown in connection with the thrust plate 22 in Fig. 1.

If desired the improved tire mounting of this invention may be organized in the modified form shown in Fig. 5 which is constructed as follows:

In this construction the inner shoe 131 is directly connected with the outer side of the shell 12 by spot welding 141 instead of being connected therewith by bolts and two take up bolts 241 are employed side by side and passed with their central parts transversely through a wide wedge 211 which is interposed between the inner shoe 131 on the shell and the outer shoe 161 bearing against the tire 11 while their ends pass through elongated washers 221 which engage with opposite sides of the shoes. This construction has the advantage of being lower in cost of manufacture and installation, and the method of attaching the inner shoe is more convenient and eliminates the use of bolts and drilling of the inner shoe and the shell for this purpose.

The procedure in using the construction shown in Fig. 5 is to loosely assemble all of the shoes and wedges complete with the tire in their general relative position on the shell before any welding or fastening of the inner shoes is done. This permits of first accurately alining the tire and completing the wedge mounting before permanently attaching the inner shoes to the shell. This is not only a saving in time but also provides an accurate final assembly inasmuch as all shoes are set up tightly against the shell in their proper running position, and the alinement of the tire may be carefully checked prior to welding the inner shoes to the shell.

Whenever it becomes necessary or desirable to remove the tire from the shell this can be readily accomplished by loosening the clamping bolts of each mounting unit and dismembering the parts thereof reversely of that described.

The mounting and unmounting of the tires by these means can be accomplished very quickly and conveniently and thereby enables repairs or adjustments on the machine to be effected expeditiously and economically in addition to enabling the tire to be easily and accurately centered with reference to the axis of the shell.

Moreover each of these mounting units is of simple and sturdy construction which enables the same to be made at low cost and to stand up under the heaviest loads which are likely to be imposed on the same and these mounting units are therefore not liable to get out of order while in use nor require frequent repairs.

I claim as my invention:

1. The combination of a tubular shell, a tire arranged circumferentially around said shell, and means for mounting said tire on said shell including an inner shoe secured to the shell, an outer shoe engaging with said tire, said shoes having their opposing sides provided with bearing faces extending lengthwise of the axes of said shell and tire, a wedge engaging its opposite sides with said bearing faces, and means for shifting said wedge including a screw having a shank working in a threaded opening in said wedge and also having a head, and a thrust plate interposed between said head and the adjacent sides of said shoes.

2. The combination of a tubular shell, a tire arranged circumferentially around said shell, and means for mounting said tire on said shell including an inner shoe secured to the shell, an outer shoe engaging with said tire, said shoes having their opposing sides provided with bearing faces extending lengthwise of the axes of said shell and tire, a wedge engaging its opposite sides with said bearing faces and means for shifting said wedge including a screw having a shank working in a threaded opening in said wedge and also having a head, a thrust plate interposed between said head and adjacent sides of said shoes, and means for holding said thrust plate against turning consisting of a stop arranged on the inner shoe and engaging with a stop face on said thrust plate.

3. The combination of a tubular shell, a tire arranged circumferentially around said shell, and means for mounting said tire on said shell including an inner shoe secured to the shell, an outer shoe engaging with said tire, said shoes having their opposing sides provided with bearing faces extending lengthwise of the axes of said shell and tire, a wedge engaging its opposite sides with said bearing faces and means for shifting said wedge including a screw having a shank working in a threaded opening in said wedge and also having a head, a thrust plate interposed between said head and the adjacent sides of said shoes, a screw nut arranged on the shank of said screw, and a thrust plate interposed between said screw nut and the adjacent sides of said shoes.

4. The combination of a tubular shell, a tire arranged circumferentially around said shell, and means for mounting said tire on said shell including an inner shoe secured to the shell, an outer shoe engaging with said tire, said shoes having their opposing sides provided with bearing faces extending lengthwise of the axes of said shell and tire, a wedge engaging its opposite sides with said bearing faces and means for shifting said wedge including a screw having a shank working in a threaded opening in said wedge and also having a head, a thrust plate interposed between said head and the adjacent sides of said shoes, a screw nut arranged on the shank of said screw, and a thrust plate interposed between said screw nut and the adjacent sides of said shoes, said inner shoe being provided on its opposite sides with stop lugs engaging with stop faces on the adjacent parts of said thrust plates.

5. The combination with a tubular shell, an annular tire arranged circumferentially around said shell, and means for mounting and adjusting said tire on said shell including an inner shoe secured to said shell and provided with a bearing recess, an outer shoe having an outer circumferential guide recess which receives an inner part of said tire and also provided with a bearing recess, the bottoms of the bearing recesses of said inner and outer shoes being inclined and converging lengthwise of the axes of said shell and tire, thrust plates engaging with corresponding sides of said shoes, a wedge engaging its opposite sides with the inclined bearing faces, and an adjusting screw having a shank working in a threaded opening in said wedge and passing through said thrust plates and provided at one end with a head engaging the outer side of one of said thrust plates and provided at its opposite end with a screw nut engaging with the outer side of the other thrust plate.

HARLAN W. HOW.